United States Patent [19]

Karlsson

[11] Patent Number: 5,005,989

[45] Date of Patent: Apr. 9, 1991

[54] ROLLER BIT

[75] Inventor: Harry L. Karlsson, Sandviken, Sweden

[73] Assignee: Sandvik AB, Sandviken, Sweden

[21] Appl. No.: 549,250

[22] Filed: Jul. 6, 1990

Related U.S. Application Data

[63] Continuation of Ser. No. 331,388, Mar. 31, 1989, abandoned.

[30] Foreign Application Priority Data

Apr. 5, 1988 [SE] Sweden .................... 8801233

[51] Int. Cl.$^5$ .................. E21B 10/22; F16C 33/72
[52] U.S. Cl. .................... 384/94; 175/371; 277/92
[58] Field of Search ............ 384/92, 93, 94, 95, 384/130, 152; 175/371, 372; 277/84, 92

[56] References Cited

U.S. PATENT DOCUMENTS

| | | | |
|---|---|---|---|
| 4,168,868 | 9/1979 | Shields | 384/94 X |
| 4,277,110 | 7/1981 | Fox | 384/94 |
| 4,279,450 | 7/1981 | Morris | 384/94 |
| 4,303,137 | 12/1981 | Fisher | 175/374 |
| 4,452,539 | 6/1984 | Evans et al. | 384/130 X |
| 4,516,641 | 5/1985 | Burr | 384/94 X |
| 4,613,004 | 9/1986 | Shotwell | 384/93 X |
| 4,722,404 | 2/1988 | Evans | 175/371 |
| 4,793,719 | 12/1988 | Crockett et al. | 384/92 |
| 4,822,057 | 4/1989 | Chia et al. | 277/84 |
| 4,824,123 | 4/1989 | Chia et al. | 277/84 |

FOREIGN PATENT DOCUMENTS

| | | | |
|---|---|---|---|
| 1260080 | 3/1961 | France | 384/92 |
| 2071739 | 9/1981 | United Kingdom | 175/372 |

*Primary Examiner*—Thomas R. Hannon
*Attorney, Agent, or Firm*—Burns, Doane, Swecker & Mathis

[57] ABSTRACT

A roller bit comprises a plurality of legs each of which has a longitudinally extending pin. A cutting cone is rotatably mounted on each of the pins and a prefabricated sealing insert is fixedly connected at a longitudinally inner end of each of the pins. A sealing element is positioned between the cone and a sealing surface of the insert. The insert is formed of a material having a hardness greater than a core hardness of the pin.

8 Claims, 2 Drawing Sheets

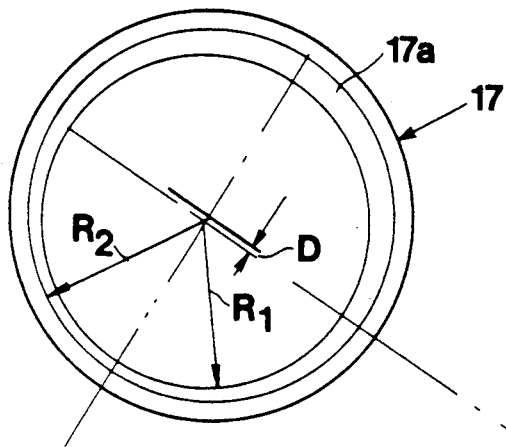
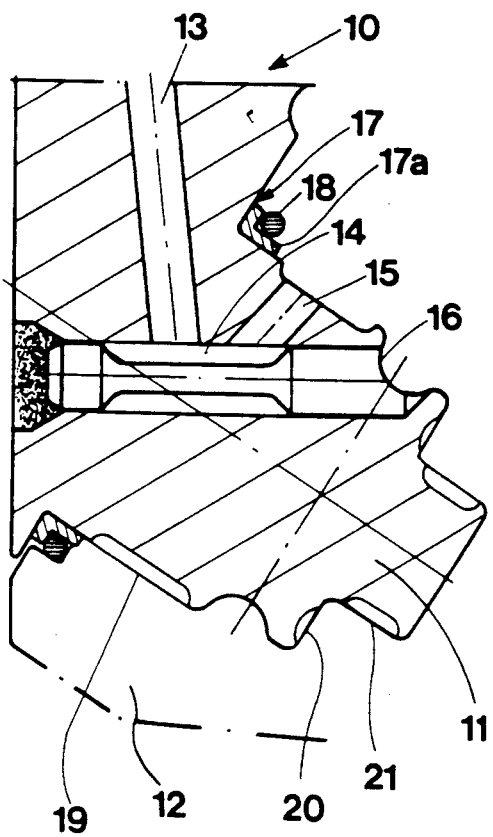
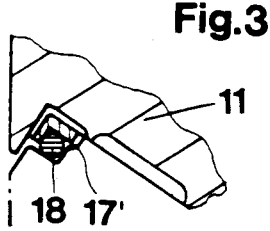
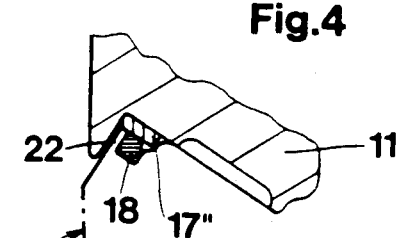
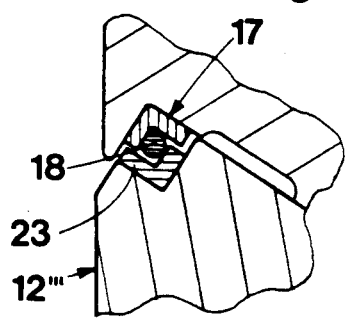
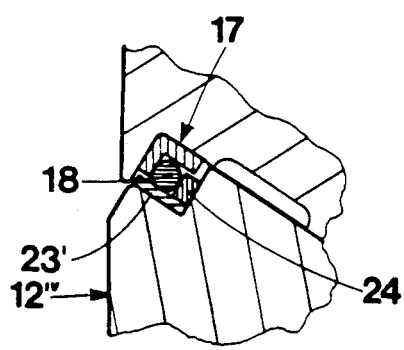

ROLLER BIT

This application is a continuation of application Ser. No. 07/331,388, filed Mar. 31, 1989 now abandoned.

BACKGROUND AND OBJECTS OF THE INVENTION

The present invention relates to a roller bit including a number of legs, preferably three, that has a pin rotatably journalling a cutting cone, that bearing races for the cutting cone are arranged on the pin, and that a sealing site for a sealing element, preferably an O-ring, is arranged at the inner end of the pin and means for locking the cutting cone relative to the pin in its axial direction. The invention also relates to a leg and a cutting cone separately.

According to prior art the sealing site of the pin for an O-ring is usually integral with the leg. However, it is also known to design the sealing site for the O-ring as a separate element, see e.g. U.S. Pat. No. 4,452,539. The aim of this structural design is to avoid corrosion of the sealing surfaces for the O-ring, i.e. sealing surfaces that according to prior art are designed integral with the leg. To solve this problem the arrangement of separate sealing surfaces for the O-ring is indicated. What is characterizing for these separate sealing surfaces is that they consist of an anti-corrosive material that is higher in the electromotive series than the surfaces of the pin that the separate elements are attached to.

The separate sealing surfaces can either be provided through plating with an anti-corrosive material or through a separate element being welded thereto, e.g. by gas-plasma welding.

The aim of the present invention is not primarily to avoid corrosion of the sealing site for the sealing element but the primary aim of the present invention is to design the sealing site as a separate sealing insert, that in a simple way can be attached to the pin.

An essentially great advantage of the present invention, including a separate sealing insert, is the freedom of material, i.e. one can choose a material selection having the wanted characteristics.

A further advantage of a separate sealing insert is that the abrasion particles can not propagate to the sealing site as easily as if it is integral with the leg.

A further advantage of a separate sealing insert is that a more even compression of the sealing element can be achieved.

A further advantage of a separate sealing insert is that it can be subjected to a number of different treatments, e.g. surface treatment, deep rolling, hardening, without one having to consider the leg. This in its turn means that the manufacturing of the leg can be carried out without considering the specified claims of the sealing insert.

BRIEF DESCRIPTION OF THE DRAWING

Below embodiments of the invention will be described, reference being made to the accompanying drawing, where FIG. 1 shows a longitudinal section through a portion of a leg of a roller bit;

FIG. 2 shows a top view of a separate sealing insert according to the invention;

FIG. 3 shows an alternative embodiment of a sealing insert according to the invention;

FIG. 4 shows another alternative embodiment of a sealing insert according to the invention;

FIG. 5 shows an alternative embodiment of the invention where also the cutting cone is provided with a separate sealing insert;

FIG. 6 shows a further embodiment of the invention where the separate sealing insert of the cutting cone consists of two parts;

DETAILED DESCRIPTION OF PREFERRED EMBODIMENTS OF THE INVENTION

Figure 7:
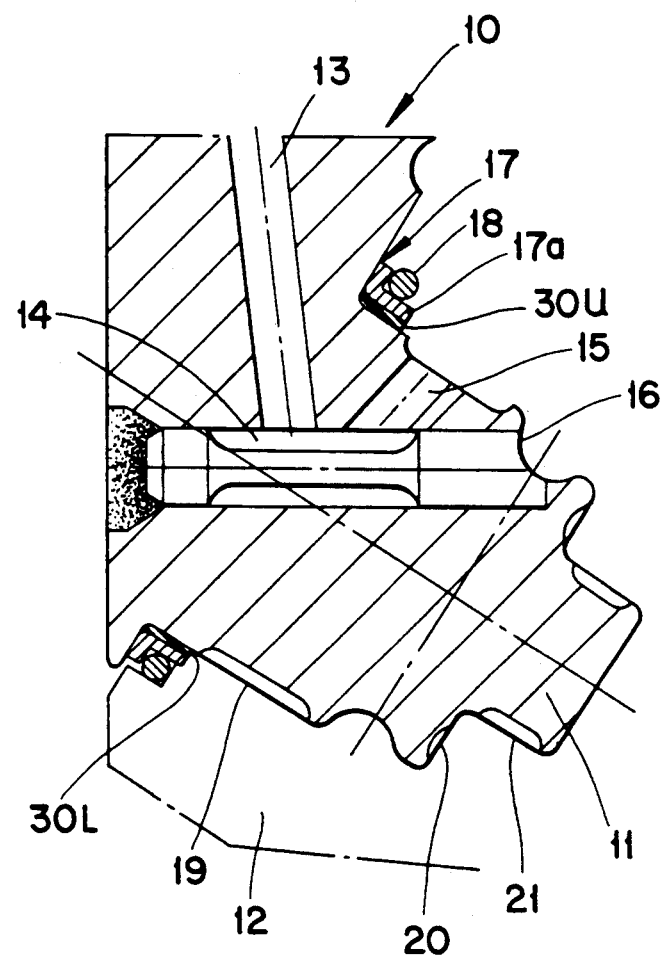
FIG. 7 is a view similar to FIG. 1 of an alternative embodiment.

The leg 10 of a roller bit, disclosed in FIG. 1, includes a bearing pin 11 that in a known way supports a cutting cone 12 being provided with cutting inserts, the cutting cone 12 being only indicated in phantom in FIG. 1.

Lubricant passages 13, 14, 15 are arranged in the leg 10 for the supply of lubricant to the bearing system between the pin 11 and the cone 12. The pin 11 is in a usual way provided with bearing races 16, 19, 20, 21 for cooperation with bearing units of the cone 12. For axial locking of the cone 12 relative to the pin 11 a ball race 16 is provided.

After the shape of the leg 10, especially the pin 11, is provided through machining, a heat treatment—normally carburizing—of the leg 10 is carried out. If toughhardening is used preferably the whole leg 10 is toughhardened.

At the inner end of the pin 11 a sealing site in the shape of a separate sealing insert 17 is arranged. The sealing insert 17 is made out of a material that is harder than the core hardness of the pin 11. Examples of possible materials for the separate sealing insert 17 to be mentioned are steel (case-hardened, carbonized, nitrocarbonized, boronized etc.), powder metallurgical composite materials, e.g. sintered carbide and ceramics, diamond coated materials.

When choosing a material for the sealing insert 17 the following should be considered. The material should have a high wear resistance combined with low friction. It is advantageous if the characteristics of the material are such that the external drilling fluid serves as lubricant.

As an alternative to the drilling fluid as lubricant the sealing insert 17 can have a certain porosity. The lubricant is stored in the pores to carry out the necessary lubrication of the sealing element. The separate sealing insert 17 is fixed relative to the pin 11, e.g. by vulcanization, adhesion, shrink fit, etc. On the outside of the sealing insert 17 a sealing is arranged in the shape of a sealing element, e.g. an O-ring 18.

As is apparent from FIG. 2 the longitudinal portion 17a abutting the pin 11 has a material thickness in the radial direction that varies along its circumference. The mechanical thickness is smallest at the lower side of the pin 11. This difference in material thickness is illustrated in FIG. 2 where the radius $R_1$ relates to the internal diameter of the portion 17a, i.e. the diameter of the opening, while the radius $R_2$ relates to the external diameter. The distance between the center of rotation for the radii $R_1$ and $R_2$ are designated by D and correspond to half the play between the pin 11 and the cone 12.

This structural design of the sealing insert 17 implies that a more even distributed compression of the sealing element in radial direction is achieved and thus a better sealing is achieved along the entire circumference of the pin 11. An evenly distributed compression of the O-ring 18 is also of importance for the friction heat that is generated between the sealing insert 17 and the O-ring 18 when the cone 12 rotates. An evenly distributed compression brings about that the maximum compression can be reduced and thus the friction heat is reduced and more evenly distributed along the entire circumference of the sealing element 18. This means that a higher speed of rotation for the cone 12 can be accepted.

As an alternative to a sealing insert having a varying material thickness it is also possible to give the vulcanized layer a varying thickness along the circumference of the sealing insert, wherein the upper portion 30U of the vulcanized layer 30 is thicker than the lower portion 30L thereof (see FIG. 7). In this case it should be pointed out that also a vulcanized layer having a constant material thickness brings about a certain equalization of the compression of the sealing element due to the flexibility of the vulcanized material.

The rest of the bearing races of the pin 11, e.g. the surfaces 19, 20, and 21, are in the disclosed embodiment furnished with inlays of a hard material, e.g. stellit.

In the embodiments according to FIG. 3 the sealing insert 17' is fixed relative to the pin 11 by welding.

The embodiment according to FIG. 4 is characterized in that the sealing insert 17" only has a single portion contacting the pin 11. To guide the O-ring in axial direction the cone 12" is designed with a tongue 22.

The separate sealing insert 17; 17'; 17" according to the present invention brings about several advantages.

Since the sealing insert does not constitute an integral portion of the bearing face less heat is transferred from the bearing to the O-ring. Also it is a smaller risk that abrasion particles from the bearing surfaces are propagating to the O-ring and cause wearing of the O-ring.

A separate sealing insert brings about an option to choose the most suitable material and machining method to achieve a wanted surface of the sealing site. This indirectly causes option to choose the most suitable material and heat treatment of the leg without being restricted to the claims laid upon the sealing site.

It is also possible that the portion of the sealing insert 17; 17'; 17" being directed towards the free end of the pin 11 is furnished with a pocket for collecting abrasion particles from the bearing surfaces.

When manufacturing the legs of the roller bit according to the present invention the legs are subjected to some kind of heat treatment. However, it is not always necessary to carburize the leg but it can be sufficient with some more unsophisticated hardening, especially in those cases when the bearing surfaces consist of stellite inlays.

Within the scope of the invention it is possible to provide the cutting cone with a separate sealing site.

In the embodiment of FIG. 5 the cutting cone 12''' is provided with a separate sealing site in the shape of an outer sealing insert 23 that is integral and fixed relative to the cutting cone 12''' in a convenient way, e.g. through vulcanization or adhesion. The hardness of the outer sealing insert 23 is in the same magnitude as the inner sealing insert 17, attached to the pin.

The embodiment disclosed in FIG. 6 relates to a separate sealing site of the cutting cone $12^{IV}$ the sealing site consisting of two portions 23' and 24' that correspond to the embodiments described above in a convenient way are fixed to the cutting cone $12^{IV}$. The advantage of the embodiment according to FIG. 6 is that the portion 23' can be made out of a hard and wear-resistant material while the portion 24 can be made out of a material that is heat insulating, e.g. plastic, fabric bakelite or ceramics.

The invention is in no way restricted to the embodiments described above but can be freely varied within the scope of the appending claims. This can be exemplified by mentioning that the ball race 16 marked in FIG. 1, with adherent ball bearing, can be substituted by other types of axial locking devices, e.g. a snap ring. The invention is of course applicable in roller bits having cutting inserts of different materials, e.g. sintered carbide, steel, diamond.

I claim:

1. A roller bit comprising a plurality of legs each leg having a longitudinally extending pin, a cutting cone rotatably mounted on each of said pins by bearing means, a prefabricated sealing insert fixedly connected at a longitudinally inner end of each of said pins and including a sealing surface at least a portion of which is situated radially between said pin and said cone, a sealing element positioned between each of said cones and a respective sealing surface, said insert formed of a material having a hardness greater than a core hardness of said pin.

2. A roller bit according to claim 1, wherein said insert is connected to said pin by a vulcanization layer.

3. A roller bit according to claim 2, wherein said vulcanization layer bonding said insert to said pin has a varying thickness along the circumference of said pin and is thinnest at a lower side of said pin.

4. A roller bit according to claim 1, wherein said insert is connected to said pin by a shrink fit.

5. A roller bit according to claim 1, wherein said insert includes a longitudinally extending cylindrical portion seated on said pin, said longitudinally extending portion having a radial thickness which varies along the circumference of said pin and is thinnest at a lower side of said pin.

6. A roller bit according to claim 1 including an additional prefabricated sealing insert fixedly connected to said cone, opposite said first-named insert, said sealing element being disposed between said inserts, said additional insert having a hardness greater than the core hardness of said pin.

7. A roller bit according to claim 6, wherein a portion of said additional insert is formed of a heat insulating material.

8. A leg of a roller bit, said leg including a longitudinally extending pin adapted to rotatably support a cutting cone, bearing races for the cutting cone being arranged on said pin, a prefabricated sealing insert fixedly connected at a longitudinally inner end of said pin and including a sealing surface for receiving a sealing element, said insert formed of a material having a hardness greater than a core hardness of said pin.

* * * * *